Feb. 27, 1940.                W. E. BAIER                2,191,553
              METHOD OF TREATING FRUITS AND VEGETABLES
                        Filed Aug. 2, 1939
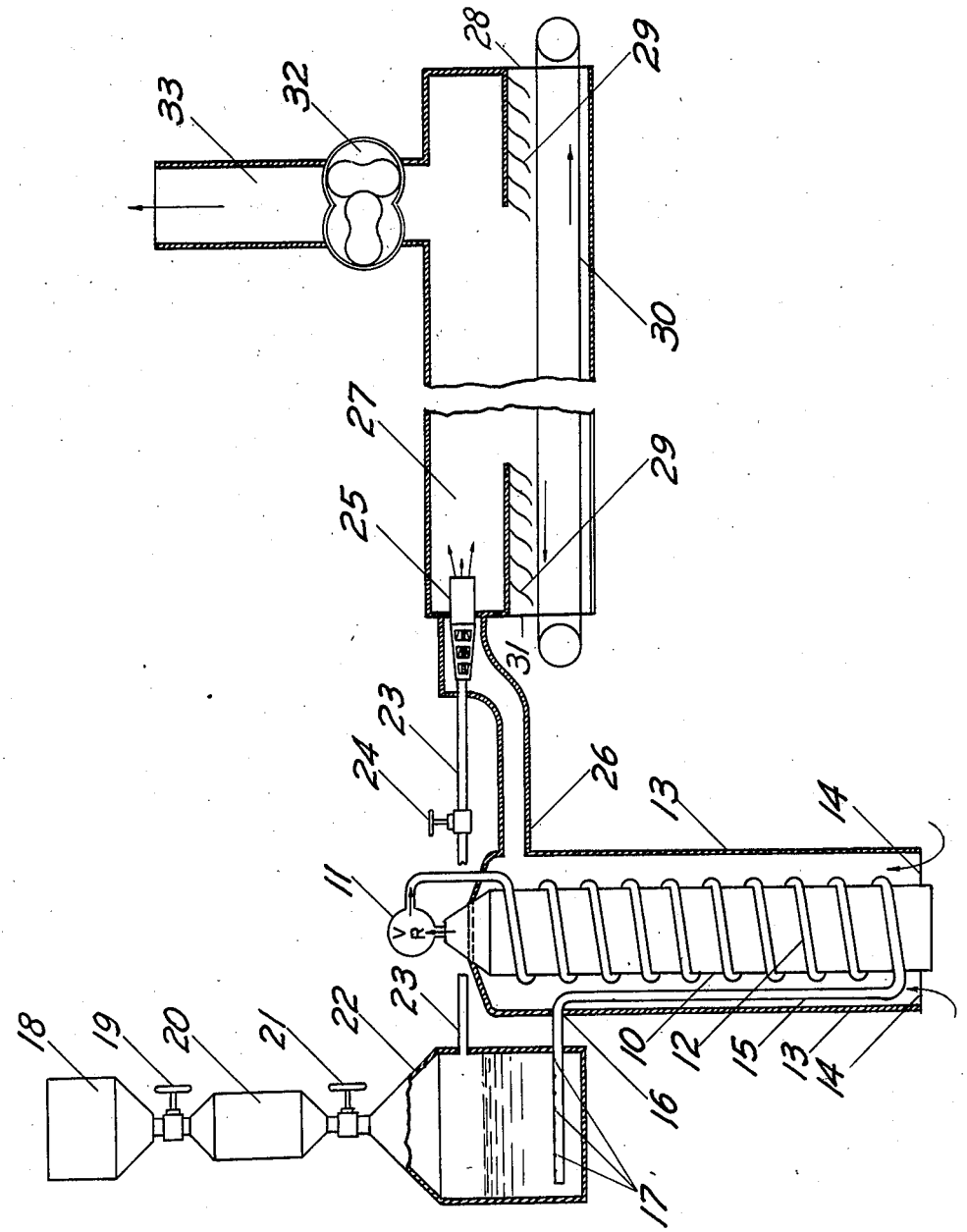
INVENTOR
Willard E. Baier.
per
Attorney Patented Feb. 27, 1940

2,191,553

UNITED STATES PATENT OFFICE 2,191,553

METHOD OF TREATING FRUITS AND VEGETABLES

Willard E. Baier, Ontario, Calif., assignor to California Fruit Growers Exchange, Los Angeles, Calif., a corporation of California Application August 2, 1939, Serial No. 288,010

15 Claims. (Cl. 99—156)

This invention relates to the treatment of fresh fruit and vegetables for the purpose of protecting these against decay organisms.

It is an object of this invention, therefore, to disclose methods and means for the treatment of fresh fruit and vegetables to reduce and practically eliminate losses due to mold decay.

Another object of this invention is to disclose methods and means for the treatment of fresh fruit and vegetables whereby cuts or abrasions on the surface of the fruit or vegetables may be effectively disinfected for the purpose of retarding mold growth.

A further object of this invention is to disclose methods and means for treating fruit or vegetables in an atmosphere of non-poisonous vapor.

A still further object is to disclose methods and means of treating fresh fruit or vegetables in an atmosphere of non-poisonous vapor and by a continuous process.

Another object of this invention is to disclose and provide methods and means of treating fresh fruit or vegetables in an atmosphere containing an alkyl borate.

A further object of this invention is to disclose methods and means of treating fresh fruit or vegetables in an atmosphere containing trimethyl borate.

All these and other objects, uses, advantages, and adaptations of the invention will be apparent from the several illustrative forms of the invention hereinafter disclosed.

The figure is a showing of apparatus suitable for carrying out my invention.

The apparatus comprises broadly means for vaporizing a fruit treating material and means for applying the treating material to the fruit. It further comprises the cooperative relationship between the various means broadly illustrated.

The showing is schematic, some parts being shown in elevation, some parts in section, and others partly in elevation and partly in section, for convenience of illustration. A cylinder 10 having a pressure reducing valve 11 is surrounded by a coil 12. Enclosing the cylinder 10 and coil 12 is a housing 13 which is open at the bottom as at 14. The coil 12 terminates in a tube 15 which may pass at 16 from the housing 13, and has a terminal perforated portion 17 within the vessel 22.

The vessel 22 may be charged through the hopper 18 which is controlled by valve 19 through which material may enter the charging chamber 20, controlled by valve 21. The vessel 22, shown partly in elevation and partly in section, is illustrated as being about half full of liquid. From the vessel 22 passes a vapor line 23 controlled by valve 24 and attached to the jet 25, which may be enclosed within an air duct 26 communicating between the housing 13 and the fruit treating chamber 27.

The fruit treating chamber 27, shown schematically and in section, has openings at 28 and 31 closed by a series of flaps 29 through which a continuous fruit conveyor 30 may be operated. The fruit treating chamber 27 is preferably provided with an exhaust blower 32 operating in connection with an exhaust pipe 33.

This invention is based upon the discovery that it is possible to treat fruit or vegetables by means of an alkyl borate compound in such a manner that boric acid will be deposited in and about the cuts and scratches on the surface of the fruit or vegetables in such concentration as will retard mold growth and mold decay. In general, the process involves bubbling carbon dioxide gas through an alkyl borate and thence passing the carbon dioxide, laden with alkyl borate, to an air jet where it is mixed with dry air. The mixture of dry air, carbon dioxide, and alkyl borate is passed into a chamber countercurrently to the movement of the fruit or vegetables being treated. In the presence of the moisture in and about the cuts and scratches on the surface of the fruit the alkyl borate is hydrolyzed to boric acid and the corresponding alcohol, i. e., trimethyl borate yields boric acid and methyl alcohol.

In carrying out the preferred embodiment of my invention, I may proceed as follows:

Carbon dioxide gas is passed from the cylinder 10 through the pressure reducing valve 11 reducing the pressure to about thirty pounds per square inch. I have found that a pressure of about thirty pounds per square inch provides sufficient movement of the $CO_2$ through the system, and seems to provide adequate cooling and drying of the air as will be explained later. The carbon dioxide gas passes from the pressure reducing valve 11 through the coil 12, the tube 15, through the perforated tube 17, and into the vessel 22 previously charged with trimethyl borate. The trimethyl borate is vaporized in the vessel 22 by means of the carbon dioxide gas and is carried through the vapor line 23 by the force of the expanding carbon dioxide gas, and is ejected at the jet 25 lying within the air duct 26. The flow of air from the open-bottomed housing 13, enclosing the cylinder 10 and the coil 12, to the fruit treating chamber 27 is aided by the passage of the carbon dioxide gas through the jet 25, and by the exhaust blower 32 communicating with the fruit treating chamber. The air which is used to mix with the carbon dioxide-tri-methyl borate vapor is thus drawn from the atmosphere at 14 through the housing 13 past the coil 12, through the air duct 26, and mixed with the carbon dioxide-trimethyl borate vapors at the jet 25 and then passed into the fruit treating chamber 27. The air as it is drawn past the coil 12 is cooled and deposits its moisture in the form of dew or frost upon the cylinder 10 and the coil 12. The refrigeration effect is obtained by the expansion of the liquid carbon dioxide in the cylinder 10 and the carbon dioxide gas as it passes through the coil 12. The valve 24 is adapted to control the flow of vapors through the vapor line 23 and also controls the amount of air-carbon dioxide-vapor mixture entering the fruit treating chamber. Fruit is admitted to the fruit treating chamber 27 through the opening 28 past the flaps 29 by means of the continuous conveyor 30 operating countercurrently to the inflow of the treating vapors. The fruit is passed from the treating chamber 27 at the opening 31. As mentioned hereinbefore, the trimethyl borate vapors hydrolyze in the presence of the moisture to produce boric acid and methyl alcohol. This phenomenon occurs in the fruit treating chamber wherever moisture is present. For the most part this hydrolysis takes place on the surface of the fruit where cuts or abrasions occur. During the hydrolysis, boric acid is deposited in the cuts and scratches on the surface of the fruit and the methyl alcohol which is formed is eliminated from the chamber along with the mixture of carbon dioxide and air. The spent vapors are vented to the atmosphere at any suitable point beyond the exhaust blower 32 as by means of the exhaust pipe 33.

I have found that it is ordinarily desirable to have the trimethyl borate vapors in contact with the fruit for a period of from 3 to 10 minutes, depending upon the temperature of the fruit treating chamber, quality of the fruit, and volume of treating vapors being passed through the treating chamber. I find that under ordinary circumstances a movement of about 10 cubic feet per minute of the mixture of carbon dioxide, air, and alkyl borate per ton of fruit is sufficient to secure adequate fungicidal control of the fruit. It is to be understood, however, that the volume of the mixture being passed through the treating chamber may be varied throughout comparatively wide limits, depending upon various conditions as, for example, the quality of the fruit being treated.

Although I may use pure trimethyl borate, I have found it very desirable to expand the generating gas through a minimum boiling mixture of trimethyl borate and methyl alcohol comprising about 75 per cent $(CH_3O)_3B$ and 25 per cent $CH_3OH$. The percentage of trimethyl borate vapors entering the vapor line 23 may, of course, be controlled by heating or cooling the vessel 22, since by heating the trimethyl borate the vaporization is increased and by cooling it is decreased.

Although the alkyl borate, such as trimethyl borate or ethyl borate, may be vaporized by means of dry air or by other means and the vapor passed over the fruit to be treated, I have found that the use of $CO_2$ offers many advantages. In particular, the $CO_2$ offers refrigeration and dehumidification of the incoming air used to mix with the treating vapors. Furthermore, by expanding the carbon dioxide gas, which is under pressure, I obtain the motivating force which moves the vapors through the system. Another very important factor in favor of the use of carbon dioxide as the carrier for the alkyl borate vapors is that it is non-inflammable and dry, the latter factor being very desirable in preventing hydrolysis of the alkyl borate in the vessel containing the alkyl borate.

Furthermore, I have found that moisture in the air being used to mix with the alkyl borate vapors will cause the alkyl borate to hydrolyze and to deposit a fine boric acid dust or powder upon the fruit being treated. This is not as desirable as confining the deposition of the boric acid to the bruised or broken surfaces of the fruit. Increasing the carbon dioxide content of the mixture of carbon dioxide, air, and alkyl borate vapor tends to prevent the deposition of boric acid dust upon the surface of the fruit.

It is to be noted that many variations will occur to those skilled in the art, for instance, whereas the cylinder 10 is shown in an upright position, it is obvious that it may be used in a prone or inverted position. Furthermore, the particular arrangements of the apparatus or the kind of apparatus used may be varied, depending upon the facilities available.

Prior methods for control of mold and other decay organisms to which the various fruits and vegetables are susceptible have been both numerous and expensive. Attempts have been made to prevent mold decay by first washing the fruit in solutions containing fungicidal materials, such as aqueous solutions of copper or manganese salts. In other processes it has been proposed that the mold decay be retarded by treating the fruit with gases, such as chlorine, hydrocyanic acid gas, nitrogen trichloride, and others. Obvious difficulties arise from the use of these various methods. In those processes which involve the use of toxic gases special hermetically sealed chambers must be provided. Furthermore, all trace of the gas must be removed before the operators can handle the treated fruit. When wash solutions are used which contain fungicidal materials, the fruit must be subsequently treated to remove the excess treating solution and then dried. Such processes involve further handling of the fruit and additional expenses for time and labor.

A process which has been used rather extensively in packing house operations involves the treatment of fruit with a solution of borax or borax-boric acid for the purpose of retarding mold growth. It has been found that boron compounds, as, for example, borax or boric acid, are apparently specific for certain molds which attack various fruits. In view of this fact, many citrus packing houses desire to use borax or other boron-containing compounds because of their high effectiveness in the control of these molds, and, more specifically, green mold. For the most part, however, the borax or borax-boric acid compounds used as wash solutions have been found impractical in many instances because the wash solutions are extremely difficult to dispose of effectively, unless an outfall sewer is available through which these wash solutions may be discharged. A common practice in the past has been to discharge them onto the land in the vicinity of the packing house, which land soon tends to become alkaline or otherwise toxic to plants and trees. Even in those cases where the land upon which the wash solutions are discharged has not become alkaline and nonproductive, it has been found that the building up of boron in the soil soon causes defoliation of the plants growing thereon.

In addition to the disposal problem, considerable expense is attached to the use of boron compounds in wash solutions since frequent renewals of the fungicidal solutions are necessary, due to the accumulation of dirt and mold spores in these solutions.

By my discovery I have provided a simple process whereby the application of a boron compound may be made directly to the fruit in a manner which obviates the disposal problem and which is not subject to other disadvantages above mentioned. Furthermore, by my process the fruit may be treated after storage for the purpose of retarding mold growth without necessitating wetting the fruit and subsequently drying the same.

In referring to this invention as applicable to the treatment of fresh fruit, it is to be understood that the term "fresh fruit" is used in a broad sense to include not only apples, pears, citrus fruit, etc., to which the term "fruit" is usually applied, but also to vegetables which can be successfully treated in the manner above disclosed. Furthermore, it is to be understood that the term "fresh fruit" is used in a broad sense to include those fruits and vegetables which are essentially in the condition in which they were harvested, although they may have been washed, stored, or otherwise treated. At the present time I have found that the process is of particular use in the treatment of fresh citrus fruit for the purpose of retarding and preventing mold growth as well as the growth and development of other organisms causing decay, and although in the description of the method reference is made more particularly to fresh fruit by way of illustrative example, it is not intended to limit the broad scope of the invention thereby.

In applying the process to oranges, for example, it has seemed best to treat the fruit after it has passed through the wash tank and has been subsequently dried. In the case of lemons it seems to be desirable to treat the fruit after storage and before packing the fruit for shipment, since investigation tends to show that treatment of lemons with boron compounds prior to storage is undesirable. Prior to my discovery, however, in the treatment of lemons, it had been the practice to run the fruit through a mold-retarding bath of soda ash and/or sodium bicarbonate prior to their storage. The treated fruit is then usually stored wet, the moisture on the fruit being allowed to dry during storage. After storage and before packing for shipment, it would be very desirable to again treat the fruit to retard mold decay in transit. However, in the past this has not been done since it would necessitate again wetting the fruit, a practice which is undesirable at this stage, since it would involve further handling and would also necessitate the installation of fruit drying equipment. Obviously, therefore, in view of the above, my method is particularly adapted to the treatment of lemons wherein such an application of a mold-inhibiting material may be applied just before the fruit is packed for shipment.

This invention is not limited to the specific materials, reagents, or equipment referred to hereinabove for illustrative purposes. All changes, modifications, and adaptations in method and equipment coming within the scope of the appended claims are embraced thereby.

Having thus fully described my invention in such clear, concise, and exact terms as to enable others skilled in the art to use the same, I claim as my invention and desire to secure by Letters Patent the following.

I claim:

1. A process for treating fresh fruit which comprises contacting the fresh fruit with an alkyl borate vapor.

2. A process for treating fresh fruit which comprises contacting the fresh fruit with trimethyl borate vapor.

3. A process for treating fresh citrus fruit which comprises contacting the fresh citrus fruit with trimyethyl borate vapor.

4. In a method of treating fresh fruit the steps of expanding carbon dioxide gas through a minimum boiling mixture of methyl alcohol and trimethyl borate for the purpose of vaporizing trimethyl borate, mixing the carbon dioxide-trimethyl borate vapor with substantially dry air, contacting the fresh fruit with the carbon dioxide-trimethyl borate-air mixture.

5. In a method of treating fresh citrus fruit the steps of expanding carbon dioxide gas through a minimum boiling mixture of methyl alcohol and trimethyl borate for the purpose of vaporizing trimethyl borate, mixing the carbon dioxide-trimethyl borate vapor with substantially dry air, contacting the fresh citrus fruit with the carbon dioxide-trimethyl borate-air mixture.

6. In a method of treating fresh fruit the steps of passing dry air through a minimum boiling mixture of methyl alcohol and trimethyl borate to vaporize trimethyl borate, contacting the fresh fruit with the trimethyl borate-air mixture.

7. In a method of treating fresh fruit the steps of expanding carbon dioxide, utilizing the refrigeration effects therefrom to cool and dehumidify air, passing said carbon dioxide through a minimum boiling mixture of methyl alcohol and trimethyl borate to vaporize the trimethyl borate, mixing the carbon dioxide-trimethyl borate vapor with said dehumidified air, contacting the fresh fruit with the carbon dioxide-trimethyl borate-air mixture.

8. In a method of treating fresh fruit the steps of expanding carbon dioxide gas through a minimum boiling mixture of methyl alcohol and trimethyl borate for the purpose of vaporizing trimethyl borate, mixing the carbon dioxide-trimethyl borate vapor with substantially dry air, contacting the fresh fruit in a continuous manner by passing the fruit countercurrently to the inflow of the carbon dioxide-trimethyl borate-air mixture.

9. In a method of treating fresh fruit the steps of expanding carbon dioxide gas through a mixture of methyl alcohol and trimethyl borate for the purpose of vaporizing trimethyl borate, mixing the carbon dioxide-trimethyl borate vapor with substantially dry air, contacting the fresh fruit with the carbon dioxide-trimethyl borate-air mixture.

10. In a method of treating fresh fruit the steps of passing dry air through a mixture of methyl alcohol and trimethyl borate to vaporize trimethyl borate, contacting the fresh fruit with the trimethyl borate mixture.

11. In a method of treating fresh fruit the steps of expanding carbon dioxide gas through a mixture of an alkyl borate and corresponding alcohol for the purpose of vaporizing the alkyl borate, mixing the carbon dioxide alkyl borate vapor with substantially dry air, contacting the fresh fruit with the carbon dioxide-alkyl borate-air mixture.

12. In a method of treating fresh fruit the steps of passing dry air through a mixture of an alkyl borate and corresponding alcohol to vaporize the alkyl borate, contacting the fresh fruit with the alkyl borate-air mixture.

13. A process for the preparation of trimethyl borate vapors which comprises passing a dry gas through a mixture of trimethyl borate and methyl alcohol.

14. A process for the preparation of trimethyl borate vapors which comprises passing dry carbon dioxide gas through a mixture of trimethyl borate and methyl alcohol, said mixture comprising about 75 per cent trimethyl borate and 25 per cent methyl alcohol.

15. A process for the preparation of alkyl borate vapors which comprises passing a dry gas through a mixture of an alkyl borate and corresponding alcohol.

WILLARD E. BAIER.

DISCLAIMER 2,191,553.—*Willard E. Baier*, Ontario, Calif. METHOD OF TREATING FRUITS AND VEGETABLES. Patent dated February 27, 1940. Disclaimer filed January 3, 1941, by the assignee, *California Fruit Growers Exchange*.

Hereby enters this disclaimer to claims 13 and 15 in said specification.
[*Official Gazette January 28, 1941.*]